(12) United States Patent
Sangberg et al.

(10) Patent No.: US 8,111,281 B2
(45) Date of Patent: Feb. 7, 2012

(54) METHODS AND TERMINALS THAT CONTROL AVATARS DURING VIDEOCONFERENCING AND OTHER COMMUNICATIONS

(75) Inventors: Troed Sangberg, Malmo (SE); Henrik Bengtsson, Lund (SE)

(73) Assignee: Sony Ericsson Mobile Communications AB (SE)

( * ) Notice: Subject to any disclaimer, the term of this patent is extended or adjusted under 35 U.S.C. 154(b) by 1257 days.

(21) Appl. No.: 11/823,984

(22) Filed: Jun. 29, 2007

(65) Prior Publication Data

US 2009/0002479 A1    Jan. 1, 2009

(51) Int. Cl.
*H04N 7/14* (2006.01)
(52) U.S. Cl. .................. 348/14.01; 348/14.08; 348/14.1
(58) Field of Classification Search .... 348/14.01–14.02, 348/14.08, 14.1; 375/240.24; 455/557, 566
See application file for complete search history.

(56) References Cited

U.S. PATENT DOCUMENTS
7,003,040 B2 *   2/2006  Yi ............................ 348/E7.081

FOREIGN PATENT DOCUMENTS
WO    WO 2004/030381 A1    4/2004
WO    WO 2004/111901 A1    12/2004

OTHER PUBLICATIONS

Notification of Transmittal of the International Search Report and the Written Opinion of the International Searching Authority, or the Declaration, International Search Report, and Written Opinion of the International Searching Authority, PCT/EP2007/064126, Apr. 24, 2008.

* cited by examiner

*Primary Examiner* — Suhan Ni
(74) *Attorney, Agent, or Firm* — Myers Bigel Sibley & Sajovec, P.A.

(57) ABSTRACT

Methods and associated wireless communication terminals are disclosed that control the display of avatars on communication terminals. A person's portrait characteristics are identified in a video stream from a video source. A portrait command is selected among a plurality of portrait commands that are known to the recipient communication terminal in response to the identified person's portrait characteristics in the video stream. The selected portrait command is transmitted to a recipient communication terminal. The recipient communication terminal can then modify a displayed avatar in response to received portrait command.

17 Claims, 5 Drawing Sheets

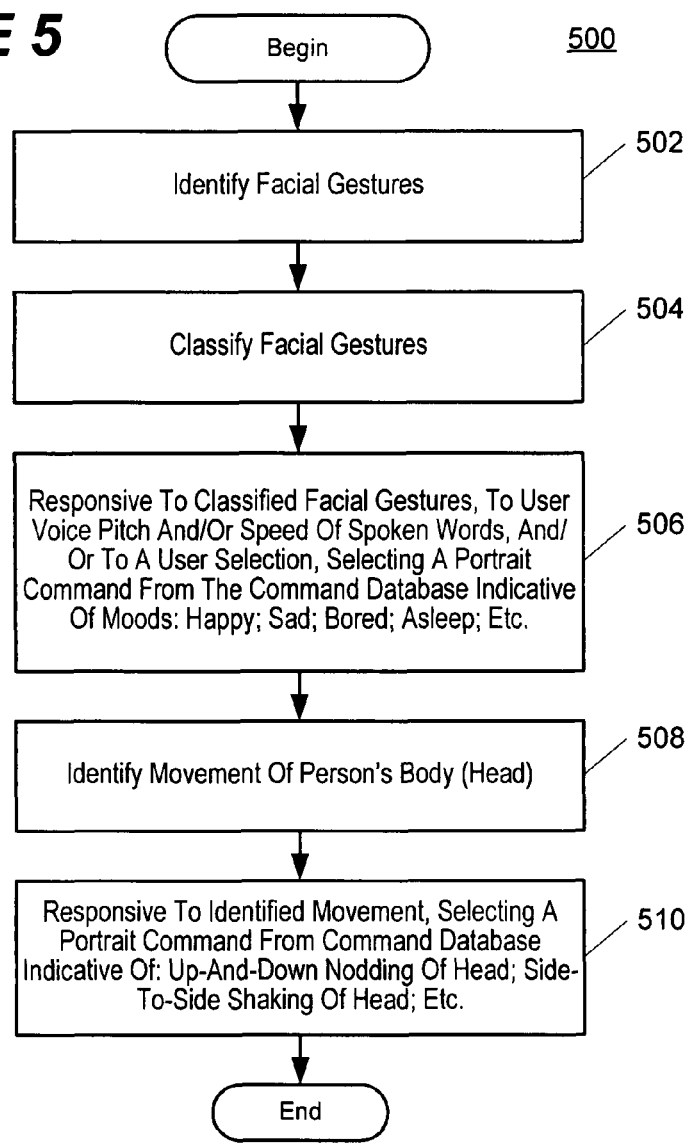
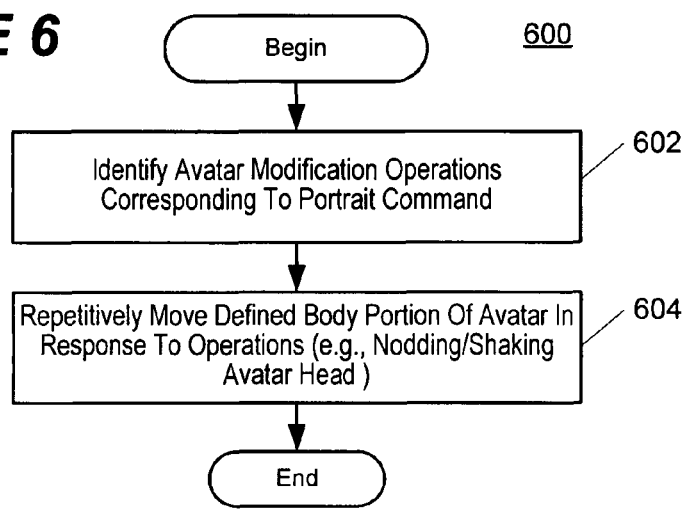

METHODS AND TERMINALS THAT CONTROL AVATARS DURING VIDEOCONFERENCING AND OTHER COMMUNICATIONS

FIELD OF THE INVENTION

The present invention relates to electronic communication terminals, and, more particularly, to videoconferencing between electronic communication terminals.

BACKGROUND OF THE INVENTION

Communication technologies are continuing to be developed to improve real-time full motion videoconferencing between wireless communication terminals. Full motion video creation and distribution for videoconferencing have necessitate the deployment of reliable high-bandwidth networks and the utilization of high processing bandwidths and storage capacities in communication terminals to support real-time video generation, encoding, distribution, receiving, and decoding functionality. Accordingly, videoconference capabilities can increase the complexity and cost of communication terminals, and may prohibit its use in some communication terminals, such as in some cellular phones.

In spite of the increased complexity and cost, the number of persons who have videoconference capable communication terminals is increasing. However, it has been found that many of these persons are reluctant to utilize videoconferencing because of an apparent reluctance to show their present appearance. Such reluctance appears to be particularly common among a younger generation who are accustomed to using instant messaging and message-based chat rooms.

SUMMARY OF THE INVENTION

Various embodiments of the present invention are directed to methods and associated wireless communication terminals that control the display of avatars on communication terminals. As will be explained in further detail below, an avatar is a computer generated two or three dimensional representation of a person.

In accordance with some embodiments, a method for controlling an avatar that is displayed at a recipient communication terminal includes identifying a person's portrait characteristics in a video stream from a video source. A portrait command is selected among a plurality of portrait commands, which are known to the recipient communication terminal, in response to the identified person's portrait characteristics in the video stream. The selected portrait command is transmitted to a recipient communication terminal. The recipient communication terminal can then modify a displayed avatar in response to received portrait command.

In some further embodiments, at the transmitting communication terminal, a person's portrait characteristics are identified in a picture and/or the video stream. An avatar is generated in response to the identified portrait characteristics. The avatar is then transmitted from the transmitting communication terminal to the recipient communication terminal during set up of a videoconference session between the transmitting and recipient communication terminals. The avatar may be generated as a three-dimensional representation of the person's body features in response to portrait characteristics identified in a two-dimensional picture and/or video stream.

In some further embodiments, identification of the portrait characteristics includes identifying facial gestures that are indicative of the person's mood. A portrait command is selected that corresponds to the indication of the person's mood. An avatar displayed by the recipient communication terminal is then modified to provide an indication of the person's mood. Selection of the portrait command can include selecting a portrait command that indicates that the person's mood is at least one of the following: happy, sad, bored, and asleep. The displayed avatar can be modified by carrying out at least one of the following: modifying a displayed mouth on the avatar to indicate smiling when the portrait command corresponds to a happy mood; modifying the displayed mouth on the avatar to indicate frowning when the portrait command corresponds to a sad mood; modifying the displayed mouth on the avatar to indicate yawning when the portrait command corresponds to a bored mood; and modifying displayed eyes on the avatar to indicate closure when the portrait command corresponds to an asleep mood. In response to a flag set on the recipient communication terminal, the displayed avatar may be modified to provide an opposite indicated mood to that indicated by the portrait command.

In some further embodiments, identification of a person's portrait characteristics can include identifying voice characteristics in a voice signal that are indicative of the person's mood. A portrait command can then be selected that corresponds to the identified voice characteristics. The portrait command may be selected in response to change in voice pitch and/or speed of spoken words in the voice signal.

In some further embodiments, an avatar displayed by the recipient communication terminal is modified in response to voice characteristics in a voice signal from the transmitting communication terminal. The displayed avatar may be modified in response to change in voice pitch and/or speed of spoken words in the voice signal.

In some further embodiments, identification of the person's portrait characteristics can include identifying repetitive movement of a body feature of the person in the video stream. A portrait command can be selected that is indicative of the repetitive body feature movement identified in the video stream. An avatar displayed by the recipient communication terminal can be modified to display repetitively movement of a feature on the avatar that corresponds to that indicated by the portrait command.

In some further embodiments, modification of the displayed avatar can be carried out by exaggerating defined features of the displayed avatar in response to user defined settings on the recipient communication terminal.

In some further embodiments, a portrait command can be selected that exaggerates defined features of an avatar displayed on the recipient terminal in response to user defined settings and the identified person's portrait characteristics in the video stream.

In some further embodiments, an avatar displayed by the recipient communication terminal can be modified in response to identifying that the transmitting communication terminal has placed the recipient communication terminal in a communication hold state.

In some further embodiments, a portrait command is selected among the plurality of portrait commands that is indicative of the transmitting communication terminal having its microphone muted. An avatar displayed by the recipient communication terminal is modified in response to the received portrait command to indicate that the transmitting communication terminal has its microphone muted.

In some further embodiments, a phone number of the transmitting communication terminal is used at the recipient communication device to select an avatar among a plurality of stored avatars. The selected avatar is then displayed at the recipient communication terminal. The displayed avatar is modified in response to the portrait command.

In some further embodiments, voice recognition is used to identify a person speaking at the transmitting communication terminal. An avatar is selected among a plurality of stored avatars in response to the identity of the person. The selected avatar is displayed at the recipient communication terminal. The displayed avatar is modified by the recipient communication terminal in response to the portrait command.

In some further embodiments, a single portrait command is selected for transmission in response to the person's portrait characteristics identified in at least one frame of the video stream. Single portrait commands may be repetitively selected for transmission in response to the portrait characteristics identified in individual frames of the video stream that are spatially separated by a defined number of skipped frames. The single portrait command is received at the recipient communication terminal, and, responsive thereto, a group of avatar modification operations is identified among a plurality of groups of avatar modification operations, which are stored in the recipient communication terminal. An avatar that is displayed by the recipient communication terminal is modified in response to the identified group of avatar modification operations.

In some other embodiments, a wireless communication terminal includes a video source that generates a video stream, a transceiver that communicates across a wireless air interface with another communication terminal, and an image processor that identifies a person's portrait characteristics in the video stream from the video source, selects among a plurality of portrait commands that are known to the recipient communication terminal in response to the identified person's portrait characteristics in the video stream, and communicates the selected portrait command through the transceiver to another communication terminal.

In some other embodiments, a wireless communication terminal includes a transceiver that is configured to receive a portrait command from another communication terminal via a wireless air interface, a display, and an image processor that is configured to carry-out modification of an avatar that is displayed on the display in response to the received portrait command.

Other systems, communication terminals, and/or methods, according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 5 is a flowchart that illustrates operations and methods for selecting a portrait command based on identification of facial gestures of a user of the transmitting communication terminal in accordance with some embodiments of the present invention.

FIG. 6 is a flowchart that illustrates operations and methods for modifying a displayed avatar in accordance with some embodiments of the present invention.

DETAILED DESCRIPTION OF EMBODIMENTS OF THE INVENTION

Figure 1:
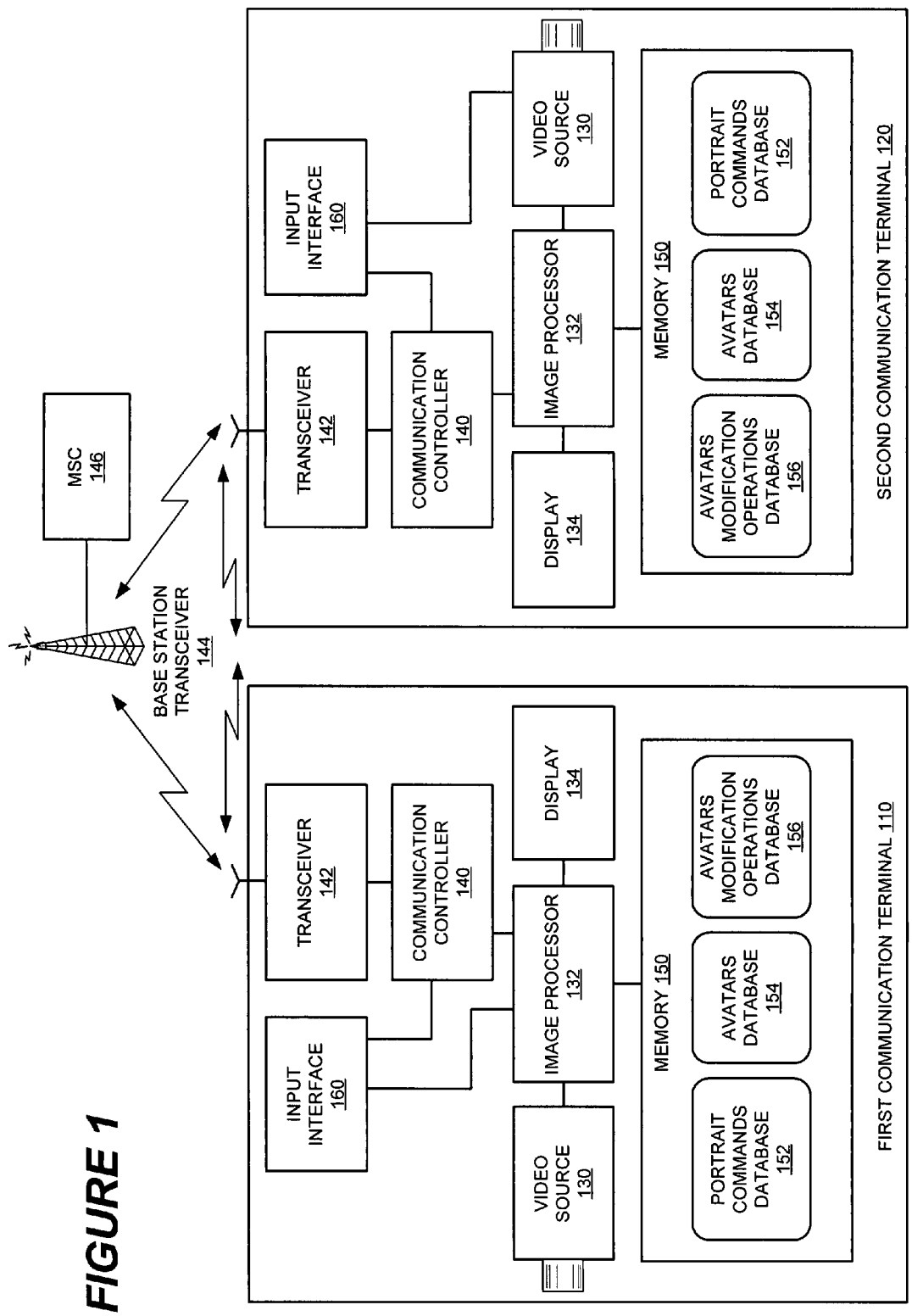
FIG. 1 illustrates a communication system that controls the display of avatars on wireless communication terminals in accordance with some embodiments of the present invention.

The present invention will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments are described with regard to flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Some embodiments of the present invention may arise from a realization that avatars may be used to represent persons during videoconferencing and other communication activities between communication terminals, and which may encourage more use of such visual communications and may decrease the network bandwidths that are utilized by these communications and may decrease the processing bandwidths and/or storage requirements of the communication terminals.

FIG. 1 illustrates a communication system that controls the display of avatars on first and second wireless communication terminals 110 and 120 in accordance with some embodiments of the present invention.

An avatar is a graphical two or three dimensional representation of a person that is generated by electronic circuitry in the communication terminals 110 and 120. As used in videoconferencing, avatars may be generated at both of the communication terminals 110 and 120 as a computer generated graphical representation of the persons who are shown in a picture/video stream captured at the respective communication terminals 110 and 120, and are transmitted between the communication terminals 110 and 120 for display thereon. An avatar may include at least a portion of a person's image from a picture/video stream, and may be generated by, for example, morphing the person's image (e.g., moving/altering facial features and/or body features), adding computer generated graphics to defined portions of the person's image (e.g., computer generated graphical facial features, graphical body features, and/or graphical accessories such as sunglasses and/or jewelry) and/or replacing the person's image with an entirely computer generated graphical likeness thereof (e.g., which may have an animated cartoon appearance). As will be described below, an avatar may be generated based on the Motion Portrait brand technology developed by Sony Corporation.

For purposes of illustration and explanation only, various embodiments of the present invention are described herein in the context of wireless communication terminals. It will be understood, however, that the present invention is not limited to such embodiments and may be embodied generally as any communication terminal that generates, selects, and/or controls avatars as described herein.

Referring to FIG. 1, the exemplary first and second communication terminals 110 and 120 can each include a video source 130, an image processor 132, a display 134, a communication controller 140, a transceiver 142, a memory 150, and a user input interface 160. The first and second communication terminals 110 and 120 can be configured to carry out videoconferencing therebetween by exchanging video streams generated from the video sources 130, and which may include images of the persons operating a respective communication terminals 110 and 120. It will be appreciated by those of ordinary skill in the art that the system, similarly, can be operated within a gaming environment, within a videoconference environment that includes more than two communication terminals, and within other communication environments where a visual representation of a participant is desired.

The communication terminals 110 and 120 are configured to communicate through a wireless air interface. The transceiver 142 typically includes a transmitter circuit and a receiver circuit which cooperate to transmit and receive radio frequency signals which may be routed through a base station transceiver 144 and a mobile switching center (MSC) 146, such as may included within a cellular communications system. The transceivers 142 of communication terminals 110 and 120 may additionally or alternatively be configured to communicate directly therebetween using a short range communication protocol. Accordingly, the communication controller 140 may be configured to encode/decode and control communications according to one or more cellular protocols, which may include, but are not limited to, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The communication controller 140 may alternatively or additionally encode/decode and control communications according to one or more short range communication protocols, which may include, but are not limited to Bluetooth and/or WiFi such as IEEE 802.11 (e.g., IEEE 802.11b-g).

The video source 130 may include, for example, a charge coupled device or other image sensor that generate a video stream, and may further generate digital still pictures. The user interface 160 may include a microphone, a joystick, a keyboard/keypad, a touch sensitive display interface, a dial, a directional key(s), and/or a pointing terminal (such as a mouse, trackball, touch pad, etc.). The display 134 may include a liquid crystal display (LCD), cathode ray tube (CRT), and/other other display technologies which can visually display computer generated graphics, and may further be configured to display full-motion video.

The memory 150 may represent a hierarchy of memory that may include volatile and/or non-volatile memory, such as removable flash, magnetic, and/or optical rewritable non-volatile memory. The memory may include a portrait command database 152, an avatars database 154, and an operations database 156 containing groups of operations that can be used to modify avatars that are displayed on the display 134.

The image processor 132 is configured to generate avatars, display avatars on the display 134, and to modify displayed avatars. The image processor 132 is also configured to control avatars that are displayed on another communication terminal using portrait commands that are generated in response to portrait characteristics identified for a person's image within a video stream from the video source 130. Various operations and methods that may be carried out by, for example, the image processor 132 to generate, select, transmit, and modify avatars are described below with regard to FIGS. 2-5.

Figure 2:
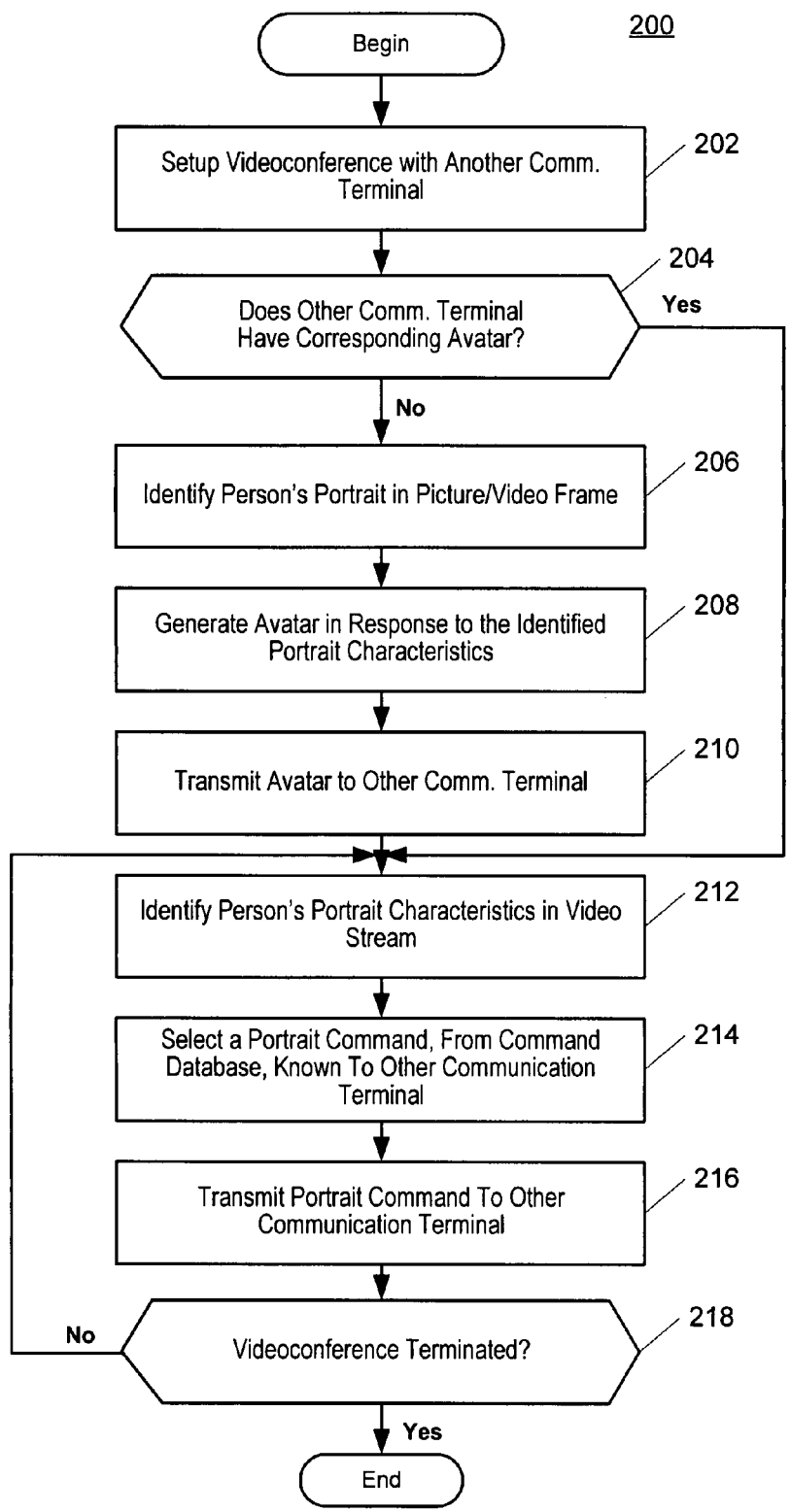
FIG. 2 is a flowchart that illustrates operations and methods for generating and transmitting avatars, and for generating and transmitting portrait commands to a recipient communication terminal in accordance with some embodiments of the present invention.

FIG. 2 is a flowchart that illustrates operations and methods 200 for generating and transmitting avatars, and for generating and transmitting portrait commands to another communication terminal. These operations and methods may be carried out at least in part by the image processor 132.

Referring to FIG. 2, the first communication terminal 110 sets up a videoconference (Block 202) with the second communication terminal 120, using the image processor 132 and the communication controller 140. The videoconference protocol may be based on, for example, one or more cellular videoconferencing protocols that are supported by the first and second communication terminals 110 and 120.

A determination is made (Block 204) as to whether the second communication terminal 120 has an existing avatar stored therein. For example, during setup of the videoconference, the second communication terminal 120 may determine based on the phone number of the first communication terminal 110 whether it has an existing avatar stored therein which is associated with that phone number and, if not, may request an avatar from the first communications terminal 110.

When the second communications terminal 120 is determined to not have a corresponding avatar (e.g., a pre-existing avatar stored in terminal 120), the first communication terminal 110 generates an avatar and transmits the avatar to the second communication terminal 120. The avatar may be generated by the image processor 132 identifying (Block 206) a person's portrait characteristics in a picture and/or video stream from the video source 130. The avatar can be generated (Block 208) in response to the identified portrait characteristics using, for example, Motion Portrait brand technology developed by Sony Corporation. For example, the image processor 132 may generate the avatar in response to its identification of a person's facial outline and/or in response to identification of facial features, such as relative size, color, and location of the hair, ears, eyes, nose, mouth, and skin surface. The image processor 132 may then generate a graphical representation, such as a two or three dimensional entirely graphical representation of the person and/or hybrid part-video part-graphical representation of the person. The image processor 132 may, for example, generate a three-dimensional graphical caricature of the person from a two-dimensional picture/video stream.

The image processor 132 may generate the avatar by, for example, morphing the person's image (e.g., moving/altering facial features and/or body features), adding computerized graphical image(s) as overlays on defined portions of the person's image (e.g., computer generated graphical facial features, body features, and/or accessories such as sunglasses and/or jewelry) and/or replacing the person's image with an entirely computer generated graphical likeness thereof. The image processor 132 transmits the avatar (Block 210) through the communication controller 140 and the transceiver 142 to the second communication terminal 120.

During an ongoing videoconference, the image processor 132 of the first communication terminal 110 is configured to control the avatar that is displayed by the second communication terminal 120, on display 134, using portrait commands that are known to the second communication terminal 120. To generate one or more portrait commands, the image processor 132 identifies (Block 212) the person's portrait characteristics in the video stream from the video source 130. The image processor 132 selects a portrait command from among the portrait commands in the database 152 in response to the identified portrait characteristics. The selected portrait command is transmitted through the communication controller 140 and the transceiver 142 to the second communication terminal 120.

FIG. 5 is a flowchart that illustrates various operations and methods that may be carried out by, for example, the image processor 132 to select a portrait command based on identification of facial gestures. Referring to FIG. 5, during an ongoing videoconference, the image processor 132 analyzes video frames in the video stream from the video source 130 to identify (Block 502) facial gestures. The image processor 132 may classify (Block 504) the identified facial gestures, such as classifying the facial gestures as indicating one or more of a plurality of defined moods, such as indicating that the person is happy, sad, bored, or asleep. The image processor 132 responds to the classification by selecting (Block 506) a portrait command from the command database 152 that is intended to cause the avatar that is displayed by the second communication terminal 120 to be changed so as to correspond to the identified facial gestures, such as to change from indicating that the person is happy to instead indicating that the person is sad, bored, or asleep (e.g., change the avatar's mouth features, eye features, hair features, body feature movement characteristics to visually indicate the person's identified mood).

Alternatively or additionally, the image processor 132 may respond to characteristics of the person's voice, such as the pitch of the voice and/or the speed of the spoken words, to select (Block 506) a portrait command from the command database 152. Accordingly, the image processor 132 may detect from the person's voice various characteristics, such as the person's mood, which can be represented by the portrait command to cause the second communication terminal 120 to modify the displayed avatar to indicate a corresponding mood on the avatar. In an exemplary embodiment, the image processor 132 may classify the person as being happy when the person's voice pitch and/or speech rate increases at least one or more threshold amounts (e.g., threshold amounts above respective median values thereof), may classify the person as being bored when the person's voice pitch and/or speech rate decreases at least one or more threshold amounts, and may classify the person as being asleep when the person's voice pitch and/or speech rate further decreases at least one or more threshold amounts. As explained above, the image processor 132 can respond to changes in these classifications by using the portrait commands to cause the second communication terminal 120 to modify the avatar that it displays is a corresponding manner.

Alternatively or additionally, the image processor 132 may respond to signals generated by the person through the interface 160 (e.g., user selection of various defined buttons on the first communication terminal 110) by selecting (Block 506) corresponding portrait commands which it transmits to the second communication terminal 120 to cause the second communication terminal 120 to modify the avatar that it displays (e.g., associate keypad buttons with causing the avatar to yawn, smile, etc.).

The image processor 132 may identify movement (Block 508) of the person's body features (e.g., head, mouth, etc.) in the video stream from the video source 130. In response to the identified movement, the image processor 132 can select (Block 510) a portrait command from the command database 152 that is indicative of the detected movement, such as indicating detected up-and-down nodding of the person's head, side-to-side shaking of the person's head, rapid movement of the person's mouth, etc. Accordingly, a single portrait command that is transmitted to the second communication terminal 120 may indicate repetitive movement of certain body features, and may cause the second communication terminal 120 to correspondingly move the avatar in an animated fashion to mimic that repetitive movement, such as by nodding the avatar's head up-and-down, by shaking the avatar's head side-to-side, by rapidly moving the avatar's mouth to mimic speech, etc.

Accordingly, the image processor 132 in the first communication terminal 110 may select one or more portrait commands in response to the identified portrait characteristics, and transmit one or more portrait commands to the second communication terminal 120 to cause the image processor 132 therein to modify a displayed avatar. The image processor 132 in the first communication terminal 110 may select a single portrait command for each individual frame of video or for a plurality of frames of video. The image processor 132 may skip a defined number of video frames between selection of portrait commands, by, for example, identifying a person's portrait characteristics in individual frames of the video stream that are spatially separated by a defined number of skipped frames of video.

Using a single portrait command to control the avatar that is displayed by the second communication terminal 120 may substantially reduce the network communication bandwidth that is utilized between the first and second communication terminals 110 and 120 and/or may reduce the processing bandwidths utilized in the communication terminals 110 and 120 to provide real-time encoding, distribution, receiving, and decoding functionality during videoconferencing. However, the image processor 132 is not limited to selecting a single portrait command per frame, as it may alternatively select a plurality of portrait commands for each frame of video for communication to the second communication terminal 120.

Referring again to FIG. 2, the selected one or more portrait commands are transmitted (Block 216) through the communication controller 140 and the transceiver 142 to the second communication terminal 120. A determination is made (Block 218) as to whether the videoconference has been terminated, and, if not, the operations of Blocks 212 through 218 can be repeated.

Figure 3:
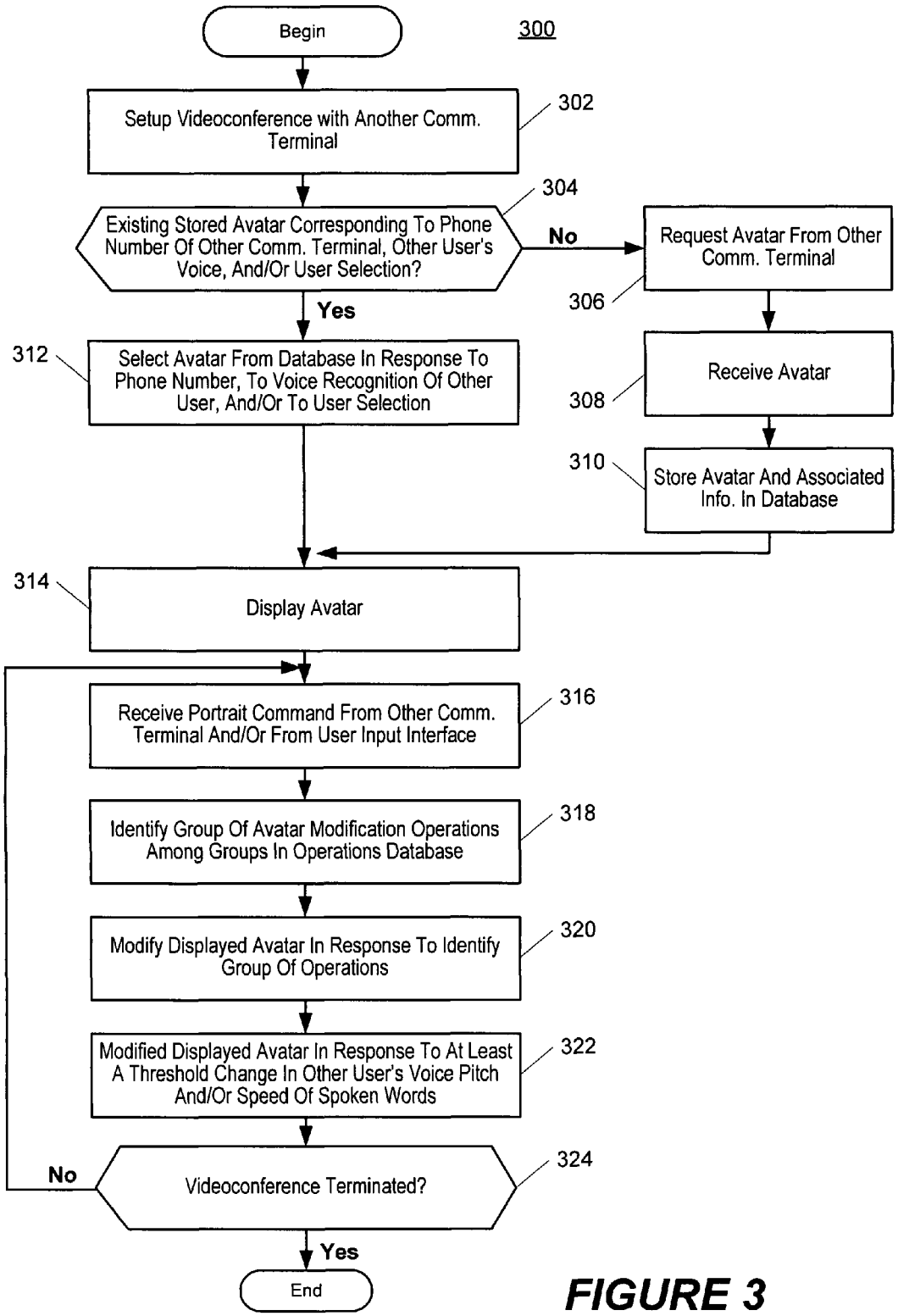
FIG. 3 is a flowchart that illustrates operations and methods for receiving/selecting avatars for display, receiving portrait commands, and modifying displayed avatars in accordance with some embodiments of the present invention.

FIG. 3 is a flowchart that illustrates operations and methods for receiving/selecting avatars, receiving portrait commands, and modifying displayed avatars, and which may be carried out primarily by the image processor 132 in the second communication terminal 120, in accordance with some embodiments of the present invention.

Referring to FIG. 3, the second communication terminal 120 sets up a videoconference (Block 302) with the first communication terminal 110, using the image processor 132 and the communication controller 140. The videoconference protocol may be based on, for example, one or more cellular videoconferencing protocols that are supported by the first and second communication terminals 110 and 120.

A determination is made (Block 304) as to whether the second communication terminal 120 has an avatar in the avatar database 154 that should be displayed on the display 134 to represent the person who is operating the first communication terminal 110 during the videoconference. The image processor 132 may make this determination by using the phone number of the first communication terminal as a pointer within the avatar database 154 to select (Block 312) a corresponding avatar, if one exists.

Figure 4:
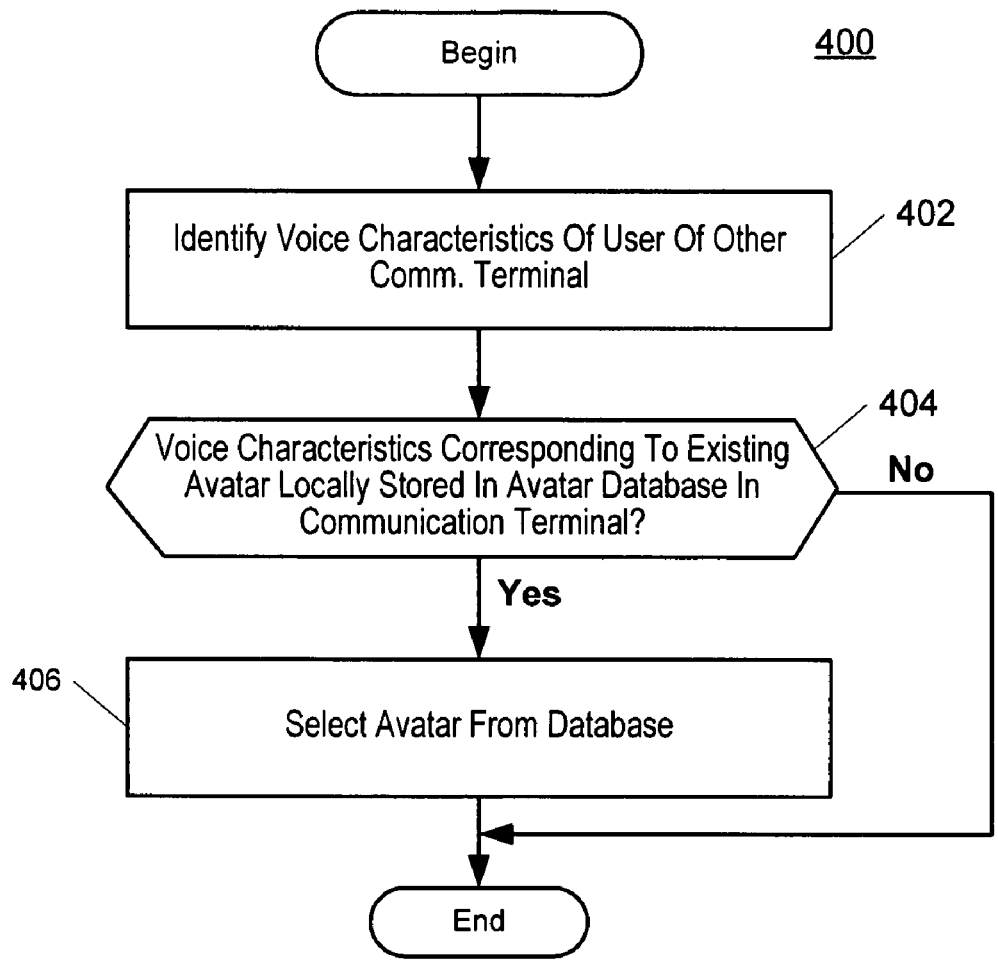
FIG. 4 is a flowchart that illustrates operations and methods for selecting an avatar based on voice characteristics of the user of another communication terminal in accordance with some embodiments of the present invention.

Alternatively or additionally, the image processor 132 may identify characteristics of the person's voice, which is receive through the videoconference, and may use those identified voice characteristics (e.g., voice recognition through pitch, speech patterns, etc.) as a pointer within the avatar database 154 to select (Block 312) a corresponding avatar, if one exists. FIG. 4 is a flowchart that illustrates operations and methods that may be used to select an avatar based on voice characteristics of the person who is speaking into the first communication terminal 110.

Referring to FIG. 4, voice characteristics of the person who is speaking into the first communication terminal 110 are identified (Block 402). Certain voice parameters, such as speech patterns, may be sampled and stored in the database 154 with an associated avatar during a videoconference/teleconference, and which may be later used to identify the voice and select the associated avatar during a subsequent videoconference call. For example, a determination is made (Block 404) as to whether the identified voice characteristics correspond to an existing avatar that is locally stored in the avatar database 154 and, if so, that avatar selected (Block 406) for display during the videoconference.

Accordingly, the second communication terminal 120 may use the phone number of the first communication terminal 110 to select (Block 312) an avatar for display during the videoconference, and/or may carry out voice-recognition on the voice of the person who is talking through the first communication terminal 110 to select (Block 312) an avatar for display during the videoconference.

During the videoconference, the image processor 132 of the second communication terminal 120 may identify when the person who is speaking through the first communication terminal 110 has changed and/or may identify a plurality of persons who are speaking, may identify voice characteristics of the other speaker(s), and may use those identified voice characteristics to select (Block 312) another avatar(s) in the avatar database 154, if it exists. The image processor 132 may then display the identified avatar(s) on the display 134 while the person's voice is being received from the first communication terminal 110. The image processor 132 may alternatively or additionally display more than one avatar, with each avatar corresponding to different identified persons' voices being received during the videoconference from the first communication terminal 110. Accordingly, a plurality of avatars may be displayed on the display 134, with each avatar representing a different speaker who using the first communication terminal 110 in, for example, a serial fashion and/or in a speaker phone configuration during the videoconference.

Alternatively or additionally, a person who is operating the second communication terminal 120 may use the interface 160 to manually select an avatar among the avatars in the database 152 for display on the display 134 during the videoconference.

When no existing avatar is identified and is not otherwise manually selected by a person using the second communication terminal 120, the second communication terminal 120 may request (Block 306) an avatar from the first communication terminal 110. In response to that request, the second communication terminal 120 may receive (308) an avatar that is to be displayed during the videoconference, and may store the avatar and associated information (e.g., the telephone number and/or other identification information for the first communication terminal 110) into the avatars database 154. The image processor 132 may additionally/alternatively identify characteristics of the person's voice who is using the first communication terminal 110, and may store the identified voice characteristics associated with the selected avatar in the avatars database 154. Accordingly, the second communication terminal 120 may associate the voice of a person to an avatar in the database 154, and may store such information in the database 154 for reuse during subsequent videoconferences.

The image processor 132 displays (Block 316) the avatar on the display 134. During the ongoing videoconference, one or more portrait commands are received from the first communication terminal 110 via the transceiver 142 and the communication controller 140. The operations database 156 contains groups of operations that are configured to carry out different avatar modifications, such as to modify the mouth on the avatar from smiling to frowning, to open and close the avatar's mouth, to blink the avatar's eyes, to cover the avatar's ears with hands, to add/remove computer-generated sunglasses to the avatar, etc. In response to the received portrait command, the image processor 132 selects a group of operations in the operations database 156 which it will use to modify a displayed avatar.

The image processor 132 modifies (Block 320) the avatar that is displayed on the display 134 in response to selected (Block 318) modification operations. For example, the image processor 132 may respond to an individual portrait command from the first communication terminal 110 by selecting (Block 318) and carrying out operations that switch the avatar's mouth between smiling and frowning, open/close the avatar's mouth, open/close one or both of the avatar's eyes, to cover the avatar's ears with hands, to add/remove computer-generated sunglasses to the avatar, etc.

FIG. 6 is a flowchart that illustrates operations and methods that may be used by the image processor 132 of the second communication terminal 120 to modify a displayed avatar. The image processor 132 identifies (Block 602) operations in the database 156 that correspond to the received portrait command. The received portrait command may instruct the image processor 132 to carry out repetitive movements (Block 604) of a defined portion of the displayed avatar, such as nodding the avatar's head (e.g., nodding in agreement), shaking the avatar's head (e.g., shaking in disagreement), moving the avatar's mouth to simulate talking/singing, and/or moving the avatars eyes to simulate blinking. Accordingly, a single portrait command from the first communication terminal 110 may be used to carry out repetitive movements of the defined portion of the avatar this displayed by the second communication terminal 120.

Referring again to FIG. 3, the image processor 132 may alternatively or additionally modify (Block 322) the avatar that is displayed on the display 134 in response to characteristics of the voice signal that is received from the first communication terminal 110. For example, the image processor 132 may select one or more avatar change operations from the database 156 in response to a least a threshold change in the voice pitch and/or speed at which words are spoken in the voice signal from the first communication terminal 110.

In an exemplary embodiment, the image processor 132 may modify (Block 322) the displayed avatar to indicate that it is happy when the received voice pitch and/or speech rate increases at least one or more threshold amounts (e.g., threshold amounts above respective median values thereof), may modify the displayed avatar to indicate that it is bored when the received voice pitch and/or speech rate decreases at least one or more threshold amounts, and may modify the displayed avatar to indicate that it is asleep when the received voice pitch and/or speech rate further decreases at least one or more threshold amounts.

A determination is made (Block 324) as to whether the videoconference has been terminated, and, if not, the operations of Blocks 316 through 324 can be repeated.

Accordingly, in some embodiments, a communication device identifies characteristics of a person's portrait in a video stream. The communication device selects a portrait command that is known to a recipient communication device in response to the identified characteristics, and it transmits the selected portrait command to the recipient communication device in order to control an avatar that is displayed by the recipient communication device.

In the drawings and specification, there have been disclosed exemplary embodiments of the invention. However, many variations and modifications can be made to these embodiments without substantially departing from the principles of the present invention. Accordingly, although specific terms are used, they are used in a generic and descriptive sense only and not for purposes of limitation, the scope of the invention being defined by the following claims.

That which is claimed:

1. A method for controlling an avatar that is displayed at a recipient communication terminal, the method comprising:
at a transmitting communication terminal, identifying a person's portrait characteristics in a video stream from a video source;
at the transmitting communication terminal, selecting a portrait command among a plurality of portrait commands that are known to the recipient communication terminal in response to the identified person's portrait characteristics in the video stream, wherein selecting a portrait command among a plurality of portrait commands comprises repetitively selecting single portrait commands for transmission in response to the person's portrait characteristics identified in individual frames of the video stream that are spatially separated by a defined number of skipped frames; and
transmitting the selected portrait command from the transmitting communication terminal to a recipient communication terminal.

2. The method of claim 1, wherein:
identifying a person's portrait characteristics comprises identifying repetitive movement of a body feature of the person in the video stream;
selecting a portrait command among a plurality of portrait commands comprises selecting a portrait command that is indicative of the repetitive body feature movement identified in the video stream; and
further comprising modifying an avatar displayed by the recipient communication terminal to display repetitively movement of a feature on the avatar that corresponds to that indicated by the portrait command.

3. The method of claim 1, further comprising:
receiving the portrait command at the recipient communication terminal; and
modifying an avatar displayed by the recipient communication terminal in response to the portrait command, wherein the modification to the avatar is carried out by exaggerating defined features of the displayed avatar in response to user defined settings on the recipient communication terminal.

4. The method of claim 1, wherein:
selecting a portrait command among a plurality of portrait commands comprises selecting a portrait command that exaggerates defined features of an avatar displayed on the recipient terminal in response to user defined settings and the identified person's portrait characteristics in the video stream.

5. The method of claim 1, further comprising:
at a transmitting communication terminal, identifying a person's portrait characteristics in a picture and/or the video stream;
generating an avatar in response to the identified portrait characteristics; and
transmitting the avatar from the transmitting communication terminal to the recipient communication terminal during set up a videoconference session between the transmitting and recipient communication terminals.

6. The method of claim 1, wherein generating an avatar in response to the identified portrait characteristics comprises generating a three-dimensional representation of the person's body features in response to portrait characteristics identified in a two-dimensional picture and/or video stream.

7. The method of claim 1, further comprising:
at the recipient communication terminal, using a phone number of the transmitting communication terminal to select an avatar among a plurality of stored avatars;
displaying the selected avatar at the at the recipient communication terminal; and
modifying the avatar displayed by the recipient communication terminal in response to the portrait command.

8. The method of claim 1, further comprising:
using voice recognition to identify a person speaking at the transmitting communication terminal using voice recognition on an audio signal from the person;

selecting an avatar among a plurality of stored avatars in response to the identity of the person;

displaying the selected avatar at the at the recipient communication terminal; and modifying the avatar displayed by the recipient communication terminal in response to the portrait command.

9. A method for controlling an avatar that is displayed at a recipient communication terminal, the method comprising:

at a transmitting communication terminal, identifying a person's portrait characteristics in a video stream from a video source;

at the transmitting communication terminal, selecting a portrait command among a plurality of portrait commands that are known to the recipient communication terminal in response to the identified person's portrait characteristics in the video stream, wherein selecting a portrait command among a plurality of portrait commands comprises selecting a single portrait command for transmission in response to the person's portrait characteristics identified in at least one frame of the video stream; and transmitting the selected portrait command from the transmitting communication terminal to a recipient communication terminal, wherein selecting a portrait command comprises:

receiving the single portrait command at the recipient communication terminal;

identifying a group of avatar modification operations among a plurality of groups of avatar modification operations, which are stored in the recipient communication terminal, in response to the single portrait command; and modifying an avatar displayed by the recipient communication terminal in response to the identified group of avatar modification operations.

10. A method for controlling an avatar that is displayed at a recipient communication terminal, the method comprising:

at a transmitting communication terminal, identifying a person's portrait characteristics in a video stream from a video source;

at the transmitting communication terminal, selecting a portrait command among a plurality of portrait commands that are known to the recipient communication terminal in response to the identified person's portrait characteristics in the video stream; and transmitting the selected portrait command from the transmitting communication terminal to a recipient communication terminal, wherein selecting a portrait command comprises:

identifying a person's portrait characteristics comprises identifying facial gestures that are indicative of the person's mood;

selecting a portrait command among a plurality of portrait commands comprises selecting a portrait command that corresponds to the identified indication of the person's mood; and further comprising:

receiving the portrait command at the recipient communication terminal; and modifying an avatar displayed by the recipient communication terminal to provide an indication of the person's mood wherein selecting a portrait command among a plurality of portrait commands comprises selecting a portrait command that indicates that the person's mood is at least one of the following: happy, sad, bored, and asleep; and wherein modifying an avatar displayed by the recipient communication terminal comprises morphing the displayed avatar by carrying out at least one of the following: modifying a displayed mouth on the avatar to indicate smiling when the portrait command corresponds to a happy mood; modifying the displayed mouth on the avatar to indicate frowning when the portrait command corresponds to a sad mood; modifying the displayed mouth on the avatar to indicate yawning when the portrait command corresponds to a bored mood; and modifying displayed eyes on the avatar to indicate closure when the portrait command corresponds to an asleep mood.

11. The method of claim 10, further comprising:

in response to a flag set on the recipient communication terminal, modifying the displayed avatar to provide an opposite indicated mood to that indicated by the portrait command.

12. A method for controlling an avatar that is displayed at a recipient communication terminal, the method comprising:

at a transmitting communication terminal, identifying a person's portrait characteristics in a video stream from a video source;

at the transmitting communication terminal, selecting a portrait command among a plurality of portrait commands that are known to the recipient communication terminal in response to the identified person's portrait characteristics in the video stream; and transmitting the selected portrait command from the transmitting communication terminal to a recipient communication terminal, wherein identifying a person's portrait characteristics comprises identifying voice characteristics in a voice signal that are indicative of the person's mood; and wherein selecting a portrait command among a plurality of portrait commands comprises selecting a portrait command that corresponds to the identified voice characteristics.

13. The method of claim 12, wherein selecting a portrait command that corresponds to the identified voice characteristics comprises selecting a portrait command in response to change in voice pitch and/or speed of spoken words in the voice signal.

14. A method for controlling an avatar that is displayed at a recipient communication terminal, the method comprising:

at a transmitting communication terminal, identifying a person's portrait characteristics in a video stream from a video source;

at the transmitting communication terminal, selecting a portrait command among a plurality of portrait commands that are known to the recipient communication terminal in response to the identified person's portrait characteristics in the video stream; and transmitting the selected portrait command from the transmitting communication terminal to a recipient communication terminal, wherein modifying an avatar displayed by the recipient communication terminal in response to voice characteristics in a voice signal from the transmitting communication terminal.

15. The method of claim 14, wherein modifying an avatar displayed by the recipient communication terminal comprises modifying the displayed avatar in response to change in voice pitch and/or speed of spoken words in the voice signal.

16. A method for controlling an avatar that is displayed at a recipient communication terminal, the method comprising:

at a transmitting communication terminal, identifying a person's portrait characteristics in a video stream from a video source;

at the transmitting communication terminal, selecting a portrait command among a plurality of portrait commands that are known to the recipient communication terminal in response to the identified person's portrait characteristics in the video stream;

transmitting the selected portrait command from the transmitting communication terminal to a recipient communication terminal; and modifying an avatar displayed by the recipient communication terminal in response to identifying that the transmitting communication terminal has placed the recipient communication terminal in a communication hold state.

17. A method for controlling an avatar that is displayed at a recipient communication terminal, the method comprising:

at a transmitting communication terminal, identifying a person's portrait characteristics in a video stream from a video source;

at the transmitting communication terminal, selecting a portrait command among a plurality of portrait commands that are known to the recipient communication terminal in response to the identified person's portrait characteristics in the video stream;

transmitting the selected portrait command from the transmitting communication terminal to a recipient communication terminal;

selecting a portrait command among the plurality of portrait commands that is indicative of the transmitting communication terminal having its microphone muted, wherein the selected portrait command is transmitted to the recipient communication terminal; and modifying an avatar displayed by the recipient communication terminal in response to the received portrait command to indicate that the transmitting communication terminal has its microphone muted.

* * * * *